United States Statutory Invention Registration [19]

[11] Reg. Number: H659

Haas [43] Published: Aug. 1, 1989

[54] PROCESS FOR ELECTROLYTICALLY PREPARING URANIUM METAL

[75] Inventor: Paul A. Haas, Knoxville, Tenn.

[73] Assignee: The United States of America as represented by the United States Department of Energy, Washington, D.C.

[21] Appl. No.: 334,031

[22] Filed: Apr. 6, 1989

[51] Int. Cl.[4] ..... C25C 3/34; C25C 1/22; C25D 3/54; C25D 5/46

[52] U.S. Cl. ..... 204/1.5; 423/19; 423/258; 423/259

*Primary Examiner*—Brooks H. Hunt
*Assistant Examiner*—Virginia B. Caress
*Attorney, Agent, or Firm*—Katherine P. Lovingood; Stephen D. Hamel; William R. Moser

[57] ABSTRACT

A process for making uranium metal from uranium oxide by first fluorinating uranium oxide to form uranium tetrafluoride and next electrolytically reducing the uranium tetrafluoride with a carbon anode to form uranium metal and $CF_4$. The $CF_4$ is reused in the fluorination reaction rather than being disposed of as a hazardous waste.

2 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

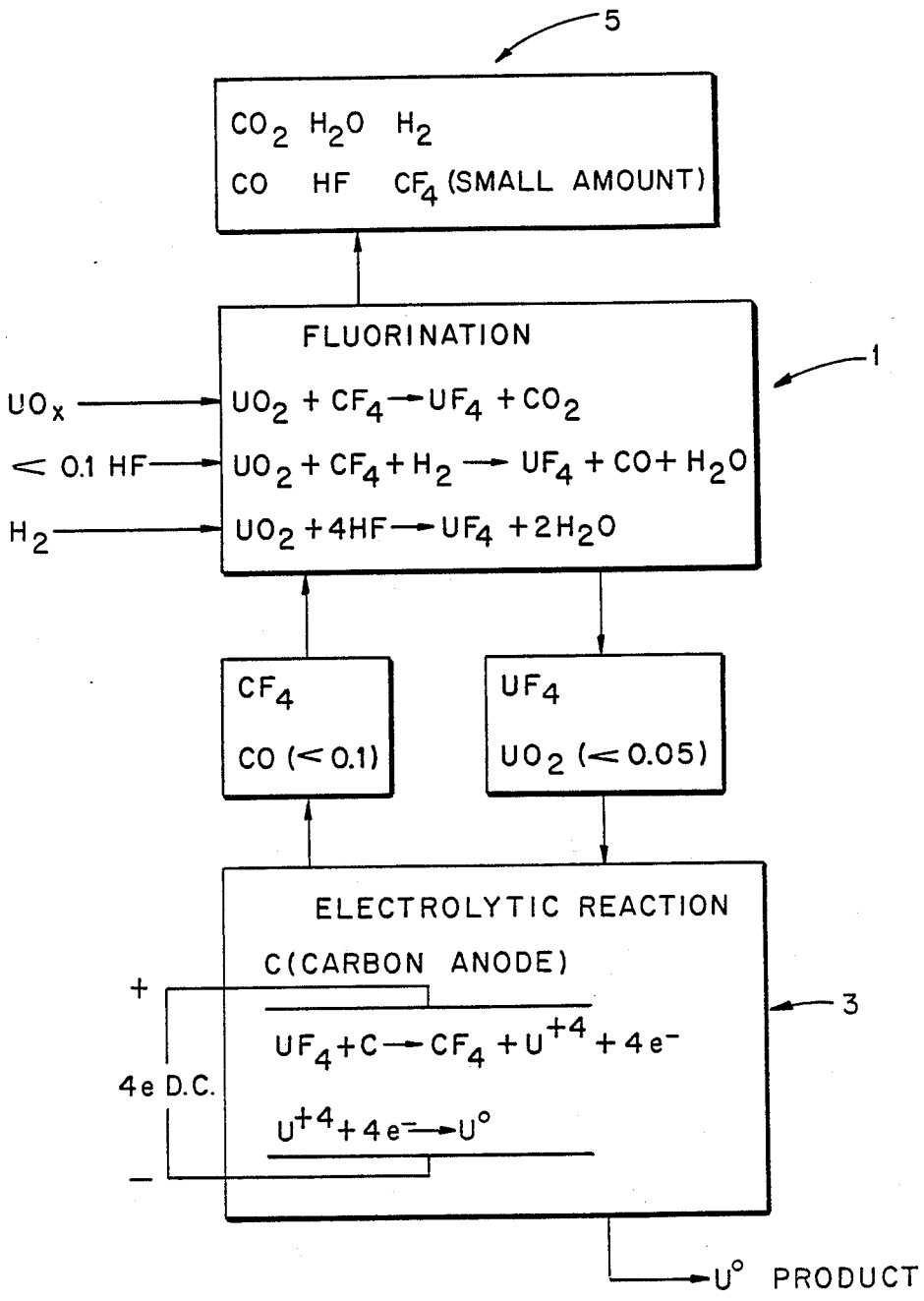
5
$CO_2$ $H_2O$ $H_2$
CO HF $CF_4$ (SMALL AMOUNT)
FLUORINATION
1
$UO_x$
$UO_2 + CF_4 \rightarrow UF_4 + CO_2$
< 0.1 HF
$UO_2 + CF_4 + H_2 \rightarrow UF_4 + CO + H_2O$
$H_2$
$UO_2 + 4HF \rightarrow UF_4 + 2H_2O$
$CF_4$
CO (< 0.1)
$UF_4$
$UO_2$ (< 0.05)
ELECTROLYTIC REACTION
C(CARBON ANODE)
3
+
$UF_4 + C \rightarrow CF_4 + U^{+4} + 4e^-$
4e D.C.
$U^{+4} + 4e^- \rightarrow U^\circ$
−
$U^\circ$ PRODUCT

PROCESS FOR ELECTROLYTICALLY PREPARING URANIUM METAL

The invention was developed pursuant to a contract with the U.S. Department of Energy.

This invention relates to a process for making uranium metal from uranium oxide using a fluorination by $CF_4$ and then by electrolytically converting $UF_4$ to U. Since $CF_4$ is the fluorinating agent for making the $UF_4$ as well as the by-product of the electrolysis it is regenerated and reused in the process.

BACKGROUND OF THE INVENTION

Electrolytic reduction has been studied for the preparation of uranium metal from uranium oxides. The desired overall reaction is $UO_2 + 2C \rightarrow 2CO + U$, and the process has many similarities to the Hall-Heroult processes for preparation of aluminum from aluminum oxide using molten cryolite. At temperatures above the melting point of uranium, uranium metal product of good purity was achieved but yields and current efficiencies were very low. Satisfactory feed of $UO_2$ to electrolytic cells is much more difficult than the feed of $Al_2O_3$ to Hall cells. The solubility of $UO_2$ is about one-tenth that of $Al_2O_3$ in Hall cells and the dense $UO_2$ settles to the bottom where it fouls the metal surface.

Yields and current efficiencies were improved by using compartmental cells to confine the oxide feed and prevent fouling of the metal surfaces. The current efficiencies were 31% as a maximum, and the cell design was not suited to scale-up to large size.

An alternative reduction reaction, $UF_4 + C \rightarrow CF_4 + U$, is possible. However, this reaction requires a makeup of $UF_4$ which is made from the reaction of $UO_2$ and large amounts of HF, a very costly chemical. Furthermore, $CF_4$ is a more troublesome gaseous waste than is CO.

Preparation of uranium in electrolytic cells has been successfully demonstrated. One study showed good cell operation using $UF_6$ as the feed. In another case, a large electrolytic cell was operated with 30 to 50% of the U metal from reduction of $UO_2$, 50 to 70% from reduction of $UF_4$. The objective of these studies was to maximize the amount of $UO_2$ feed; the higher the percentages of $UF_4$ were easier to use, but a large fraction of $UF_4$ feed with little $UO_2$ was not tested. A problem revealed by these studies was that $UO_2$ settled out in the electrolysis cell due to its low solubility and high density.

SUMMARY OF THE INVENTION

In view of the above needs, it is an object of this invention to provide a process for electrolytically preparing uranium metal from $UF_4$ with a recycling of the fluoride.

It is another object of this invention to provide a process for electrolytically preparing uranium metal wherein fouling of the electrolytic cell is minimized.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the process of this invention may comprise: a first reaction wherein a fluoride and $UO_2$ are reacted to form $UF_4$; a second reaction wherein the $UF_4$ formed in the first reaction is electrolytically converted to $U^{\circ}$ by using a carbon anode resulting in the formation of $CF_4$ as by-product., and subsequent to the second reaction, the $CF_4$ formed is recycled into the first reaction for reuse as fluorinating agent. The process allows the recycling of a troublesome fluorocarbon, $CF_4$, and also minimizes the feed of $UO_2$ to the electrolytic cell thus avoiding the problem of fouling the metal surface. Also the consumption of the carbon anode is reduced since the waste product is $CO_2$ instead of CO.

FIGURE

The FIGURE is a schematic chemical flowsheet representing the electrolytic reduction process of this invention.

DETAILED DESCRIPTION OF THE PREFERRED EMBODIMENT

The invention is a combination of an electrolytic cell where the principal overall reaction is $UF_4 + C \rightarrow CF_4 + U^{\circ}$ with a feed reactor where the primary reaction is $CF_4 + UO_2 \rightarrow UF_4 + CO_2$. The two reactions together give the preferred overall reaction $UO_2 + C \rightarrow CO_2 + U^{\circ}$. Moderate amounts of $UO_2$ that remain in the $UF_4$ feed to the cell will dissolve and produce metal by the overall reaction $UO_2 + 2C \rightarrow 2CO + U^{\circ}$. The utilization of two separate reactors allows separate optimization of the operating conditions of each reaction. The electrolytic cell is optimized for reduction to metal without concern about the amounts of CO and $CF_4$ products. The feed rector is optimized for recycle of fluorides as $UF_4$ to give an efficient conversion of reactants to $UF_4$, thus eliminating the mixing and settling of $UO_2$ solids as a cell operating problem. The consumption of anode carbon is reduced because the final by-product is mostly $CO_2$ instead of CO.

The reactions of $CF_4$ with uranium oxides are thermodynamically favorable. A number of reactions can be written with $UO_2$ and $CF_4$ as reactants and $UF_4$ as one product. Some of interest are:

$$UO_2(s) + CF_4(g) \rightarrow UF_4(s) + CO_2(g)$$

$$UO_2(s) + CF_4(g) + H_2(g) \rightarrow UF_4(s) + CO(g) + H_2O(g)$$

Both these reactions are favored with $\Sigma \nabla_f G^{\circ}$ of $-310$. KJ $mol^{-1}$ and equilibrium constants at 1100° K. of about $5 \times 10^{14}$. This result agrees with the behavior in-cell where $UF_4$ reacts to form $CF_4$ only when there is a deficiency of $UO_2$. The second reaction is probably more favorable as an excess of $H_2$ and the two gaseous products should allow a more complete utilization of the $CF_4$. The $H_2$ can also provide a complete reduction of U(VI) to U(IV).

The modified electrolytic reduction process can be shown as a schematic chemical flowsheet as shown in the FIGURE. Fluorination 1 takes place in the fluorination and reduction reactor where $UF_4$ is produced to be sent to the electrolytic cell accompanied by a small amount of $UO_2$. Also produced in the fluorination and reduction reactor are byproducts $CO_2$, $H_2O$, $H_2$, CO, HF and a small amount of $CF_4$ that are expelled as offgases 5. The electrolytic reaction 3 takes place in the cell containing a carbon anode and produces uranium metal product as well as $CF_4$ by-product that is recycled to the fluorination reaction 1 along with a small amount of CO.

In prior studies of electrolytic reduction, the use of $UO_2$ was considered preferable to the use of $UF_4$ to avoid evolution of the undesirable $CF_4$ by-product. Therefore, even when $UO_2$ and $UF_4$ were used together as starting materials, which improved efficiency, the use of $UF_4$ was minimized to minimize $CF_4$ offgas. This invention solves that problem by reusing instead of disposing of waste $CF_4$.

I claim:

1. A process for converting $UO_2$ to uranium metal comprising:

a first reaction wherein a fluoride compound and $UO_2$are reacted in a first reaction chamber to form $UF_4$;

a second reaction wherein said $UF_4$ and unreacted $UO_2$ are electrolytically converted in a second reaction chamber, said second reaction chamber being an electrolytic cell, to U° by using a carbon anode resulting in the formation of $CF_4$ as by-product;

and subsequent to said second reaction, recycling said $CF_4$ into said first reaction for reuse of said fluoride.

2. The process of claim 1 wherein said first reaction further comprises adding $H_2$ in said first reaction chamber.

* * * * *